(No Model.)

W. G. BELL & W. P. GAY.
CLUTCH MECHANISM.

No. 297,489. Patented Apr. 22, 1884.

Witnesses:
E. A. Phelps.
T. Ladenmiller Jr.

Inventors
William G. Bell,
William P. Gay.
by their attorney

United States Patent Office

WILLIAM G. BELL AND WILLIAM P. GAY, OF BOSTON, MASSACHUSETTS, ASSIGNORS TO SAID BELL.

CLUTCH MECHANISM.

SPECIFICATION forming part of Letters Patent No. 297,489, dated April 22, 1884.

Application filed January 2, 1884. (No model.)

*To all whom it may concern:*

Be it known that we, WILLIAM G. BELL and WILLIAM P. GAY, citizens of the United States, residing at Boston, in the county of Suffolk and State of Massachusetts, have jointly invented certain new and useful Improvements in Clutch Mechanism; and we do hereby declare that the same are fully described in the following specification and illustrated in the accompanying drawings.

The object of this invention is to improve friction-clutches for machines of all kinds by dispensing with external brackets and devices for connecting the shipping-lever with the sliding clutch, and employing instead a tubular shaft for the driving-pulley to turn on, and a longitudinally-moving rod through the axis thereof to actuate the clutch.

Our invention consists in the devices and combinations of devices set forth in the appended claims.

Figure 1:
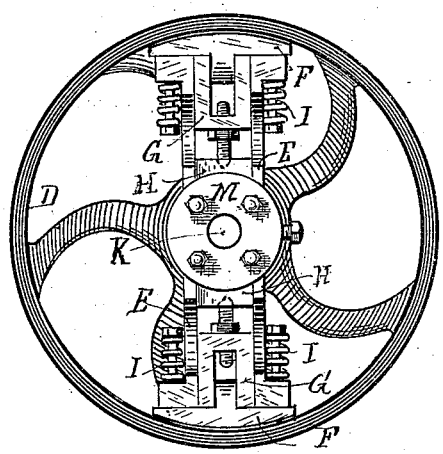
Figure 2:
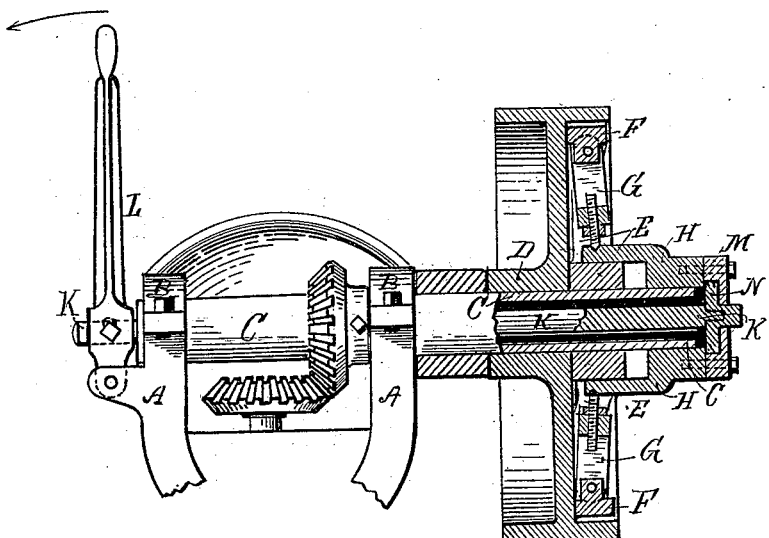

In the drawings, Figure 1 is a side view of a pulley provided with our improvements; and Fig. 2 is an elevation of the lever, shaft, and gearing, with the pulley and clutch in section.

Upon a suitable frame, A, provided with bearings B, a hollow shaft, C, is mounted for rotation. A pulley, D, turns freely on this shaft, except as it is engaged therewith by a suitable clutch. The drawings represent a well-known form of clutch, having a cross-bar, E, secured to the shaft and supporting two friction-segments, F, which are brought into contact with the rim of the pulley by toggles G, actuated by the longitudinal movement of a sliding-hub, H, and are freed from such contact by the reverse movement of the hub and the reaction of springs I.

The essential novelty of our apparatus is in the hollow shaft and the means of operating any suitable clutch through it. These means, as shown, include the actuating-rod K, provided with the pivoted lever L, or with a knob, screw, or other device, to move the rod longitudinally, and also some effective connection with the hub H, so that it can be reciprocated slightly upon the hollow shaft. We prefer to form this part of our mechanism as indicated in the drawings. The hub has a cap, M, secured to it, recessed to receive loosely a collar, N, formed on or attached to the outer end of the rod K, which it serves to hold centrally in the hollow shaft. We usually make this collar of composition metal, for better lubrication during rotation of the hub and its cap. The collar occupies an annular space between the hub and its cap, and hence imparts to them the reciprocating movement of the rod K, and permits them to revolve about it when by such movement the toggles have brought the segments F into frictional contact with the inner face of the pulley-rim. The reverse movement releases such contact, and places the parts in the positions shown in the drawings, where the pulley D may freely revolve without rotating any of the other parts.

We are aware that various forms of clutch mechanism of a complicated nature have been heretofore devised, having on a hollow slotted shaft a fast pulley and a loose pulley, operated by a rotating rod working in said shaft, with external threaded sleeves or other expensive attachments. Examples of such construction are shown in the patents of Sweett and Woodman, May 5, 1874; Parkhurst, May 12, 1874; Manville, June 16, 1874; Starbuck, February 2, 1875, and Carver, March 9, 1875, which we disclaim. Our device requires but a single pulley of the plainest form. The hollow shaft around which it revolves is a simple unslotted tube, and the clutch-operating rod passes loosely entirely through said tube, and does not revolve with it.

The simplicity, convenience, and self-contained character of our apparatus are obvious, and will be appreciated in practical use.

We claim as our invention—

1. The tubular unslotted shaft C and the single belt-pulley D, mounted loosely thereon, in combination with the clutch-operating rod K, extending entirely through said shaft, the lever L or other actuator at one end of said shaft, and clutch mechanism at the other end thereof, adapted by the reciprocation of said rod to be frictionally engaged with said pulley and disengaged therefrom, substantially as set forth.

2. A belt-pulley of ordinary form loosely mounted on a plain tubular shaft, so as to revolve freely about the same without imparting motion thereto, in combination with a cross-bar secured to said hollow shaft, and a non-rotary rod reciprocating within it and engaging with a hub which carries toggles adapted to actuate two friction-segments at the extremities of said cross-bar, substantially as and for the purpose set forth.

3. The hollow shaft C, the rotary pulley D, and the sliding hub H, in combination with the pivoted lever L, the non-rotary reciprocating rod K, and the collar N, engaging internally with the hub, substantially as and for the purpose set forth.

In testimony whereof we hereto affix our signatures in presence of two witnesses.

WILLIAM G. BELL.
     WILLIAM P. GAY.

Witnesses:
 A. H. Spencer,
 E. A. Phelps.